United States Patent
Lavallee

(10) Patent No.: US 6,215,904 B1
(45) Date of Patent: Apr. 10, 2001

(54) APPARATUS AND METHOD FOR SELECTING ENCODING SCHEMES BASED UPON IMAGE CONTENT

(75) Inventor: Pierre A. Lavallee, Fairport, NY (US)

(73) Assignee: Xerox Corporation, Rochester, NY (US)

(*) Notice: Subject to any disclaimer, the term of this patent is extended or adjusted under 35 U.S.C. 154(b) by 0 days.

(21) Appl. No.: 08/351,102

(22) Filed: Nov. 30, 1994

(51) Int. Cl.[7] .................................. G06K 9/36; G06K 9/46
(52) U.S. Cl. .................................................. 382/234; 382/239
(58) Field of Search ................................. 382/234, 239, 382/180, 282, 176, 177, 306; 358/453, 462, 467

(56) References Cited

U.S. PATENT DOCUMENTS

| | | | |
|---|---|---|---|
| 3,496,543 | * 2/1970 | Greenly | 382/176 |
| 5,204,756 | * 4/1993 | Chevion et al. | 358/467 |
| 5,270,837 | * 12/1993 | Chen et al. | 358/467 |
| 5,276,531 | * 1/1994 | Chen et al. | 358/467 |
| 5,293,430 | 3/1994 | Shiau et al. | |
| 5,327,262 | * 7/1994 | Williams | 358/462 |
| 5,339,172 | * 8/1994 | Robinson | 358/467 |
| 5,392,362 | * 2/1995 | Kimura et al. | 382/239 |
| 5,517,327 | * 5/1996 | Nakatani et al. | 382/232 |

* cited by examiner

*Primary Examiner*—Amelia Au
*Assistant Examiner*—Timothy M. Johnson
(74) *Attorney, Agent, or Firm*—Finnegan, Henderson, Farabow, Garrett & Dunner, L.L.P.

(57) ABSTRACT

An image scanner apparatus scans a document and provides image data in digital form representing the scanned document. The compression apparatus detects characteristics of the image data and compresses the image data using parallel compressors, each employing a different encoding scheme. The apparatus then selects compressed image data encoded by one of the compressors in accordance with the detected characteristics and stores the selected data.

20 Claims, 3 Drawing Sheets

APPARATUS AND METHOD FOR SELECTING ENCODING SCHEMES BASED UPON IMAGE CONTENT

BACKGROUND OF THE INVENTION

1. Field of the Invention

The present invention relates to image compression. More particularly, the present invention relates to an apparatus and method for optimally compressing image data containing pictorial and text images.

2. Description of the Related Art

Conventional scanners provide digital data representing images from black/white and color documents, for example. Such digital data is then stored in memory; this digital data may be gray (e.g., 8 bits/pixel for black/white data or 24 bits/pixel for color data) or binary. Because considerable memory may be required to store such data, data encoders are often used to compress the data before it is stored, thereby conserving valuable memory. The compressed data is subsequently decompressed to produce the scanned image.

Although numerous different encoding schemes are available, each has deficiencies in encoding image data. Encoding schemes which use gray data as input can be set-up to be "lossy," (e.g., having high compression ratios), resulting in some image degradation due to data loss. That is, gray image data compressed and decompressed using lossy encoding schemes cannot be fully recovered; while these gray data encoding schemes work reasonably well for continuous tone image data, typically containing low contrast images, they are not effective for text/line graphic gray image data, typically containing high contrast images. Similarly, encoding schemes which use binary data as input and are set up to be "lossless," are effective for text/line graphics image data but are poor for halftone image data.

Also, different encoding schemes may be desirable in compressing different image data types, such as pictorial (continuous tone or halftone) or text. However, once a data encoder employing a particular encoding scheme is selected, the data encoder encodes the image data without regard for the image data type. Because documents may contain both pictorial (continuous tone or halftone) and text (character and line graphics) images, compressing image data representing a scanned document using a single encoding scheme may provide undesirable results. Thus, it is also desirable to optimally compress image data according to the different image data types.

SUMMARY OF INVENTION

Accordingly, the present invention is directed to an image encoding apparatus and method that substantially solves one or more of the problems due to limitations and disadvantages of the related art.

One advantage of the invention is compression and storing of image data with minimal image degradation as when printed on printers with different characteristics.

Another advantage of the invention is reduced memory requirements for storage of compressed image data without significant image degradation.

To achieve these and other advantages and in accordance with the purpose of the invention, as embodied and broadly described, the invention includes an image compression apparatus comprising means for detecting image characteristics of image data, first means for encoding the image data in accordance with a first encoding scheme, second means for encoding the image data in accordance with a second encoding scheme, means for selectively storing encoded image data from one of the first and second encoding means in accordance with the detected image characteristics.

In another aspect, the invention includes a method of data compression, comprising the steps of receiving image data; detecting image characteristics in the received image data; compressing the received image data using a first compressor; compressing the received image data using a second compressor; selecting compressed image data from one of the first and second compressors based upon detected image characteristics; and storing the selected image data in memory.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate a preferred embodiment of the invention, and, together with the description, serve to explain the principles of the invention.

In the drawings.

DETAILED DESCRIPTION

Figure 1:
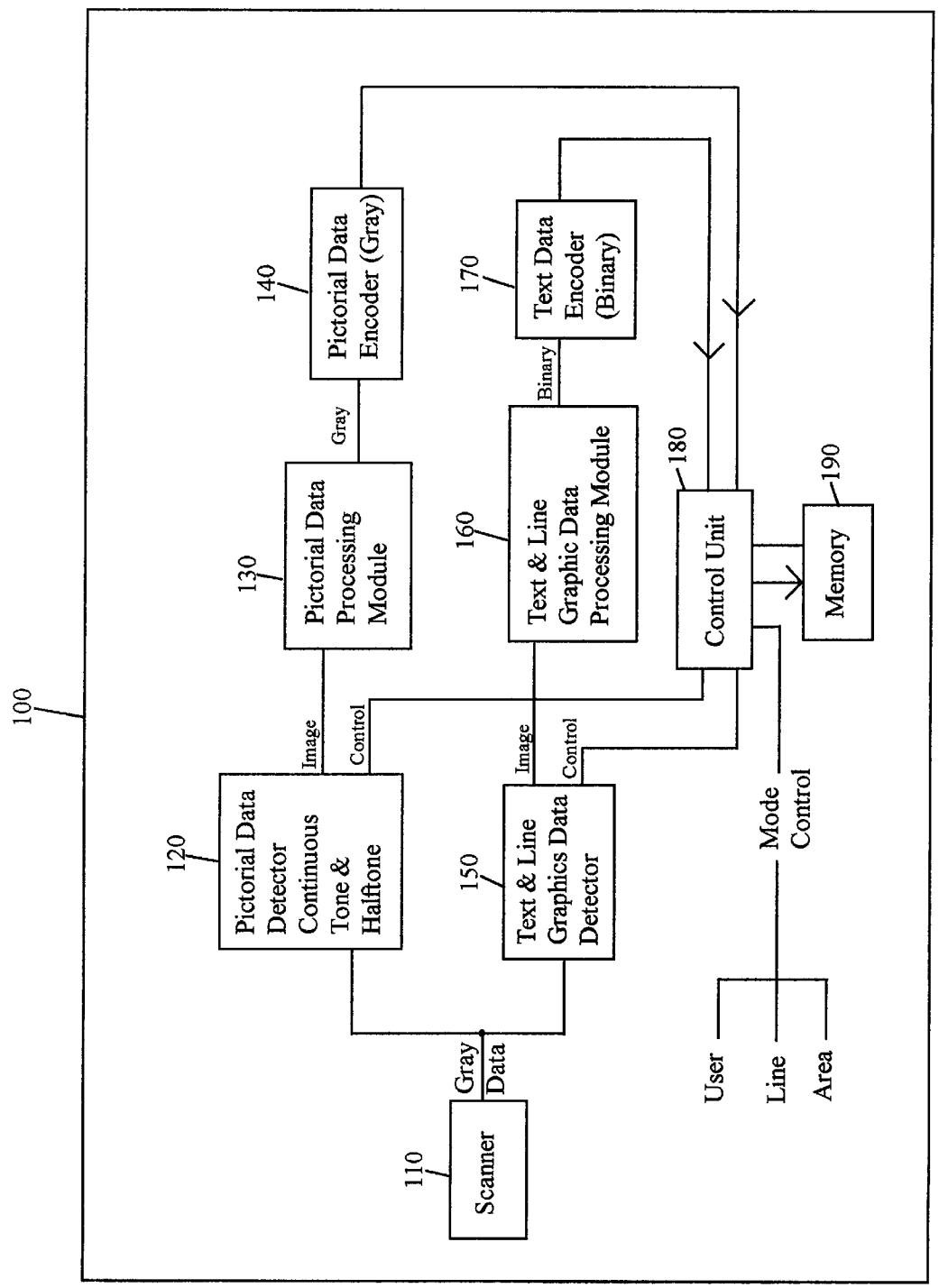
FIG. 1 is a block diagram illustrating components of an image compression apparatus, in accordance with a preferred embodiment of the invention.

In accordance with the invention, an image scanner apparatus scans a document and provides image data representing the scanned document in digital form. An image segmentation apparatus detects characteristics of the image data and a compression apparatus compresses the image data using parallel compressors, each employing a different encoding scheme. The apparatus then selects compressed image data encoded by one of the compressors in accordance with the detected characteristics and stores the selected data.

Reference will now be made in detail to the present preferred embodiment of the invention, which is illustrated in the accompanying drawings in which like reference characters refer to corresponding elements.

As shown in FIG. 1, the apparatus 100, representing an embodiment of the invention, includes a scanner 110, a pictorial data detector 120, a pictorial data processing module 130, a pictorial data encoder 140, a text data detector 150, a text data processing module 160, a text data encoder 170, a control unit 180, and a memory 190.

Scanner 110 scans a document (not shown) and preferably provides gray image data, representing the scanned document in digital form, to both pictorial data detector 120 and text data detector 150. In one embodiment, scanner 110 provides successive scan lines of image data in serial format. Scanner 110 may be any conventional scanner capable of scanning a black/white or a color document.

The pictorial data detector 120 and text data detector 150 are arranged in parallel with each other and preferably both receive image data provided by scanner 110. Detectors 120 and 150 detect image characteristics of the image data, and preferably determine whether the image data corresponds to pictures or text, in accordance with conventional techniques. For example, such a technique is described in U.S. Pat. No. 5,293,430, issued Mar. 8, 1994, to Shiau et al., the contents of which are hereby incorporated by reference.

In this embodiment, detectors 120 and 150 are preprogrammed to analyze the image data received from scanner 110 in groups of 64 pixels, for example. It is contemplated that detectors 120 and 150 can analyze the image data in groups of more or less pixels, depending upon design considerations. For each group of pixels, detectors 120 and 150 preferably determine whether the group corresponds to pictorial data or text data by analyzing certain attributes of the group, such as the number of tone changes between contiguous bits (i.e., "high frequency" indicates frequent tone changes between contiguous pixels, while "low frequency" indicates infrequent tone changes between contiguous pixels) and degree of contrast (i.e., the difference between tone intensities of contiguous pixels).

Figure 2:
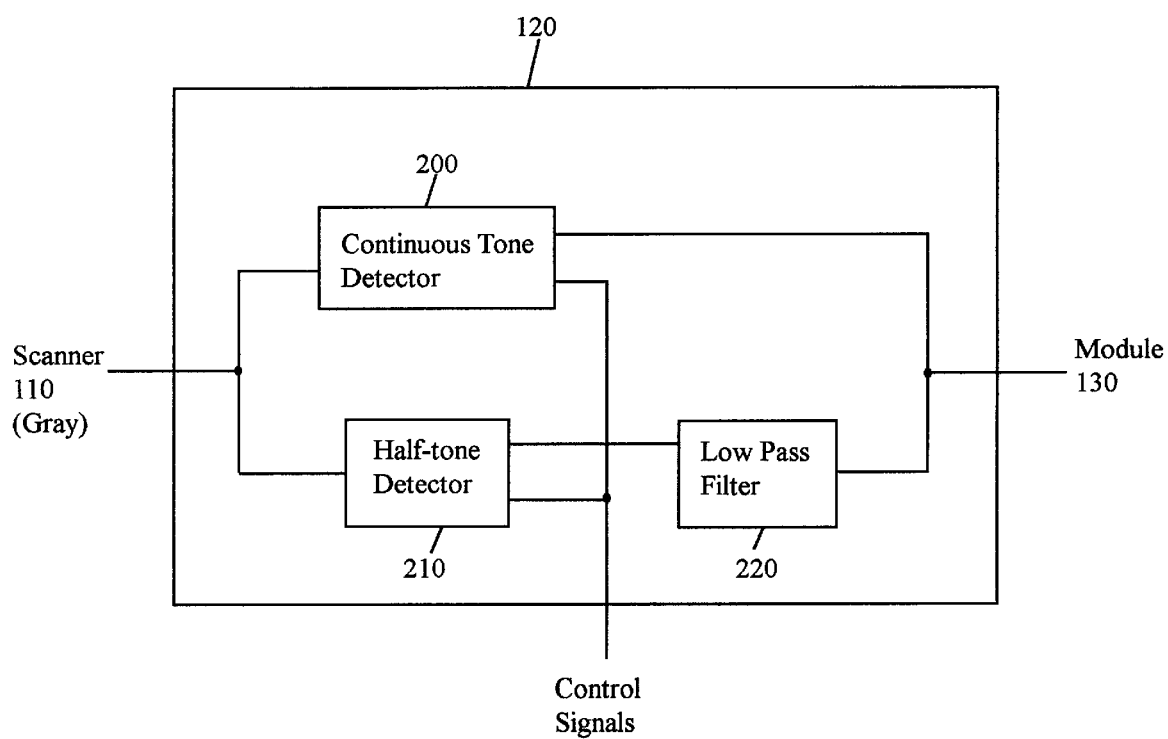
FIG. 2 is a block diagram showing components of a pictorial data detector used in the image compression apparatus shown in FIG. 1, in accordance with a preferred embodiment of the invention.

In one embodiment, when detector 120 determines that a group of pixels only has a low frequency of low contrast tone changes, detector 120 determines that the group corresponds to a "continuous tone image," which is typically representative of a photographic image. Also, when detector 120 determines that a group has a repetitive pattern of tone changes, detector 120 determines that the group corresponds to a halftone type of image also typical of a picture. Upon determining that a group corresponds to a continuous tone or halftone image, the detector 120 transmits a signal to control unit 180, indicating that the group contains pictorial data. Detector 120 is described in greater detail below with reference to FIG. 2.

After detecting image characteristics, detector 120 transmits the groups of pixels to pictorial data processing module 130. Module 130 receives and processes the image data from pictorial data detector 120. This typically includes low pass filtering, enhancement, or other well known image processing algorithms needed to reduce aliasing, false contouring and loss of detail.

Module 130 outputs the processed image data to pictorial data encoder 140. The encoder 140 preferably encodes the processed data in accordance with an encoding scheme having an adjustable compression ratio. Although such an encoding scheme results in minor degradation of the decompressed image, such degradation in images containing pictures can be controlled to be so slight as to be acceptable. Encoder 140 then outputs the gray encoded data to control unit 180. In one embodiment, the encoder 140 is a known JPEG compressor.

Further, as discussed above, text data detector 150 receives image data from scanner 110. When detector 150 determines that a group of bits has a low frequency of high contrast tone changes or a non-repetitive pattern of high contrast tone changes, detector 150 determines that the group of pixels corresponds to an image containing text/line graphics. Upon such a determination, detector 150 transmits a signal to control unit 180 indicating that the group contains text/line graphic data.

Detector 150 transmits the group of pixels to text/line graphic data processing module 160. Module 160 receives and processes the image data from text data detector 120. Preferably, module 160 converts the image data with enhancement and other well known text/line graphic image processing algorithms. Module 160 also converts this image data type into binary data, thereby initially compressing the image data.

Module 160 outputs the processed binary image data to text/line graphic data encoder 170. The encoder 170 preferably encodes the processed data in accordance with an encoding scheme having lossless compression properties. Although such an encoding scheme does not maximize compression of the image data, this encoding scheme results in no image degradation, which would otherwise be intolerable in images containing text and is significantly more effective than using a gray data encoder. Encoder 170 outputs the encoded data to control unit 180. In one embodiment, the encoder 170 is a known Group IV CCITT data compressor.

Accordingly, in this arrangement, detector 120, module 130 and encoder 140 process image data in parallel with detector 150, module 160, and encoder 170. Thus, encoders 140 and 170 both encode image data for each group of bits and provide the respectively encoded data to control unit 180.

Control unit 180 receives the encoded data from encoder 140 and encoder 170 and stores the encoded data from one of the encoders in memory 190 in accordance with the mode to which control unit 180 is set. Control unit 180 is described In greater detail with reference to FIG. 3.

In one embodiment, control unit 180 can operate in one of three selectable modes: a user selection mode, an auto line mode, and an auto area mode. When control unit 180 is set to the user selection mode, control unit 180 stores compressed image data in accordance with settings specified by a user. In one embodiment, the user enters into control unit 180 sets of coordinates defining areas within a scanned document and the image types corresponding to the different areas. For example, a user may define a rectangular area within a document as containing text and the remaining areas as containing pictures. In an alternative embodiment, the user can place "cues" in different areas throughout an original document to specify various image types. The cues are then included in the scanned image data. When control unit 180 receives image data containing the cues, control unit 180 recognizes these cues as specifying the image types of the different areas.

In the user selection mode, control unit 180 determines, for each group of pixels, the user-defined area within which a received group is located and the image type specified for that particular area. Control unit 180 then selectively stores the image data compressed by encoder 140 or encoder 170 in accordance with the determined image type.

When control unit 180 is set to the auto line mode, control unit 180 stores the image data compressed by either encoder 140 or encoder 170 in memory 190, in accordance with the control signals received from detectors 120 and 150. As described above, these control signals indicate the image type of each group of pixels.

Thus, in one embodiment, control unit 180 stores a group of pixels encoded by encoder 140 when the control signal from detector 120 indicates that the group contains pictorial data. Also, control unit 180 stores a group of pixels encoded by encoder 170 when the control signal from detector 150 indicates that the group contains text data. When detectors 120 and 150 cannot determine conclusively the image type for a group of bits, control unit 180 defaults to text data, for example, and stores the compressed image data from encoder 170. Such a case may arise, for example, when detectors 120 and 150 indicate that a group of bits contains pictorial and text data.

When set to the auto area mode, control unit 180 operates in a manner similar to the auto line mode, except control unit does not default to one of the image types when detectors 120 and 150 cannot determine the image type of a group of bits. Instead, in the auto area mode, control unit 180 preferably analyzes the image types of image data near the indeterminate group of pixels and infers the image type of the indeterminate group from the analysis (such as majority rule).

In the usual case, text and pictures occupy an area larger than a single scan line and wider than a single group of bits. Accordingly, control unit 180 assumes that the image type of an indeterminate group of bits is the same image type as image data found near the indeterminate group (i.e., above, below, left, and right). Preferably, control unit 180 maintains a degree of confidence associated with the inferred image type, which is related to the amount of nearby image data having the same image type as the assumed image type. When the degree of confidence exceeds a threshold level, control unit 180 determines that the indeterminate group contains image data of the assumed image type and accordingly stores the image data compressed by the appropriate encoder.

Memory 190 stores compressed image data selected by control unit 180, in accordance with one embodiment of the invention. The image data is preferably compressed in accordance with encoding schemes found in encoders 140 and 170 and stored in memory 190 in groups. Memory 190 also stores tags associated with each group, identifying the encoding scheme in which that group was encoded. In this way, when the compressed image data is read from memory 190, the encoding schemes applied to the image data can be easily identified from the tags and the image data appropriately decoded.

As described above, pictorial data detector 120 determines whether image data corresponds to an image containing a picture. In one embodiment, shown in FIG. 2, detector 120 includes a continuous tone detector 200, a halftone detector 210, and a low pass filter 220. Detectors 200 and 210 receive image data from scanner 110 in groups of continuous pixels. If detector 200 or 210 determines that a group of pixels corresponds to continuous tone or halftone images, respectively, then that detector generates a control signal indicating that such a determination has been made.

In this embodiment, when detector 200 determines that a group of pixels has a low frequency of low tone changes, detector 200 determines that the group corresponds to a "continuous tone image," which is typically representative of a photographic image. Detector 200 generates an appropriate control signal and outputs the group of pixels, as received, to module 130. In this case, detector 210 also receives the control signal from detector 200 and accordingly does not output image data to low pass filter 220 so that image data from low pass filter 220 is not combined with the image data from detector 200.

When detector 210 determines that a group has a repetitive pattern of tone changes, detector 210 determines that the group corresponds to a halftone image, which is also typical of picture data. Detector 210 generates an appropriate control signal and outputs the group of pixels to low pass filter 220, which smooths the half tone image into a continuous tone image. Low pass filter then outputs the filtered image data to module 130. Here, detector 200 receives the control signal from detector 210 and accordingly does not output the image data to module 130 so that image data from detector 200 is not combined with the image data output from filter 220.

Figure 3:
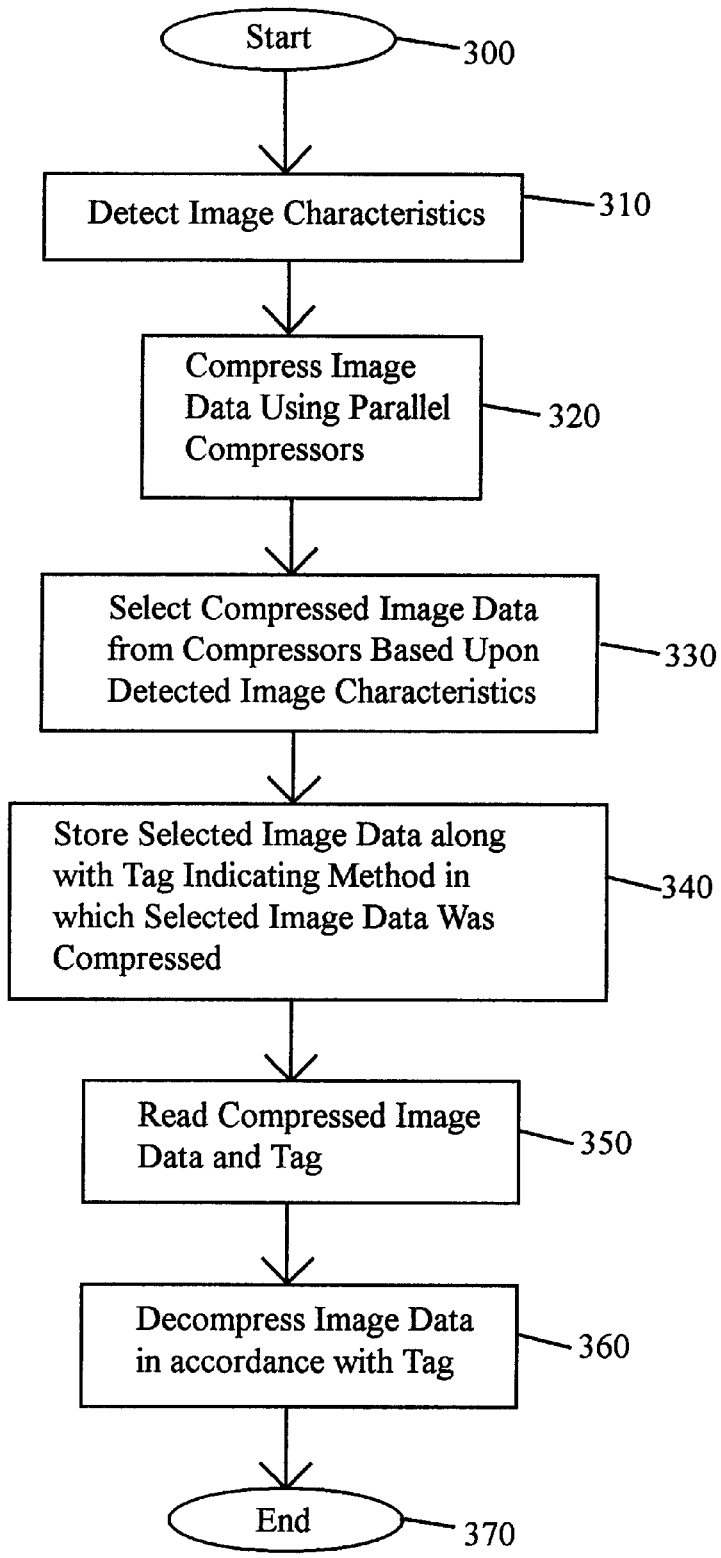
FIG. 3 is a flow diagram depicting steps of a method, in accordance with a preferred embodiment of the invention.

FIG. 3 depicts a flow diagram of a compression and decompression method, in accordance with one embodiment of the invention. Initially, an image compression apparatus receives image data (step 300). The apparatus detects certain image characteristics in the image data (step 310). As described above, the apparatus determines whether the image data corresponds to picture or text.

The apparatus compresses the image data using parallel compressors (step 320) and selects the compressed image data from one of the compressors based upon the detected image characteristics (step 330). The apparatus stores in memory the selected image data along with a tag indicating the method in which the selected image data was compressed (i.e., the encoding scheme) (step 340).

When the stored image data is ready to be retrieved, the compressed image data and its associated tag are read from the memory (step 350). A decoder decompresses the image data applying a decoding scheme in accordance with the tag (step 360). Finally, the decompressed image data is assembled to produce the image (step 370).

It will be apparent to those skilled in the art that various modifications and variations can be made in the image compression apparatus and method of the present invention without departing from the spirit or scope of the invention. For example, additional detectors and encoders may be provided in parallel with the other detectors and encoders for detecting additional image characteristics in the image data and encoding the image data in accordance with additional encoding schemes.

Thus, it is intended that the present invention cover the modifications and variations of this invention provided they come within the scope of the appended claims and their equivalents.

In the claims:

1. An image compression apparatus comprising:
    means for generating a first set of control signals indicating whether image data contains pictorial image data or text image data based upon image characteristics;
    first encoding means for encoding the image data in accordance with a first encoding scheme optimized for pictorial image data;
    second encoding means for encoding the image data in accordance with a second encoding scheme optimized for text image data, as the first encoding means encodes the image data; and
    control means for receiving encoded image data from both the first encoding means and the second encoding means and for selecting encoded image data from one of the first and second encoding means based upon the first set of control signals.

2. The image compression apparatus according to claim 1, wherein the first and second encoding means are arranged in parallel with respect to each other.

3. The image compression apparatus according to claim 1, wherein the generating means includes means for determining that the image data contains pictorial data.

4. The image compression apparatus according to claim 1, wherein the generating means includes means for determining that the image data contains text data.

5. The image compression apparatus according to claim 1, further comprising means for obtaining image data.

6. The image compression apparatus according to claim 5, wherein the obtaining means includes a scanner.

7. The image compression apparatus according to claim 1, further comprising means for selectively storing encoded image data from one of the first and second encoding means in accordance with user selected information.

8. The image compression apparatus according to claim 1, wherein the pictorial image data includes at least one of continuous and halftone image data.

9. A method of data compression, comprising the steps of:

receiving image data;

detecting image characteristics in the received image data;

generating a first set of control signals indicating whether the received image data contains pictorial image data or text image data based upon the detected image characteristics;

compressing the received image data using a first compressor;

compressing the received image data using a second compressor, as the first compressor compresses the received image data;

receiving compressed image data from both the first compressor and the second compressor;

selecting compressed image data from one of the first and second compressors based upon the first set of control signals; and storing the selected image data in memory.

10. The method of data compression according to claim 9, further comprising the step of:

storing a tag associated with the stored image data indicating a method in which the stored image data was compressed.

11. The method data compression according to claim 10, further comprising the steps of:

reading the compressed image data and associated tag from memory; and decompressing the read image data using a decompression method corresponding to the associated tag.

12. The method of data compression according to claim 9, wherein the step of detecting image characteristics includes determining whether received image data includes at least one of pictorial data and text data.

13. The apparatus according to claim 1, wherein the control means comprises means for receiving a second set of control signals and for selecting encoded image data from one of the first and second encoding means based upon the first and second sets of control signals.

14. The apparatus according to claim 13, wherein the second set of control signals represents the selection of a user selection mode.

15. The apparatus according to claim 13, wherein the second set of control signals represents the selection of an auto line mode.

16. The apparatus according to claim 13, wherein the second set of control signals represents the selection of an auto area mode.

17. The method according to claim 9, further comprising the step of receiving a second set of control signals, and wherein the step of selecting compressed image data comprises the substep of selecting compressed image data from one of the first and second compressors based upon the first and second sets of control signals.

18. The apparatus according to claim 17, wherein the second set of control signals represents the selection of a user selection mode.

19. The apparatus according to claim 17, wherein the second set of control signals represents the selection of an auto line mode.

20. The apparatus according to claim 17, wherein the second set of control signals represents the selection of an auto area mode.

* * * * *